Oct. 23, 1951  R. S. COLLEY ET AL  2,572,246
EXPANSIBLE RIVET ASSEMBLY
Filed Jan. 3, 1949
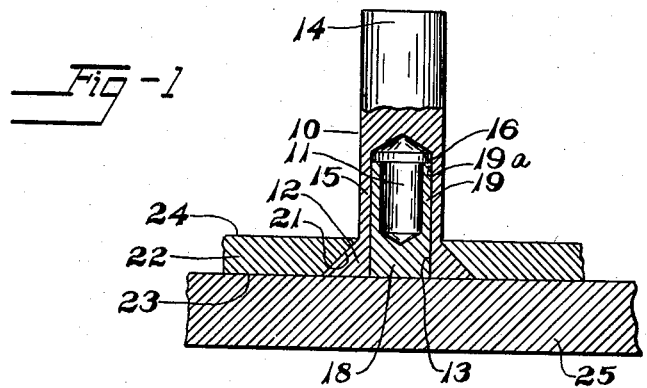
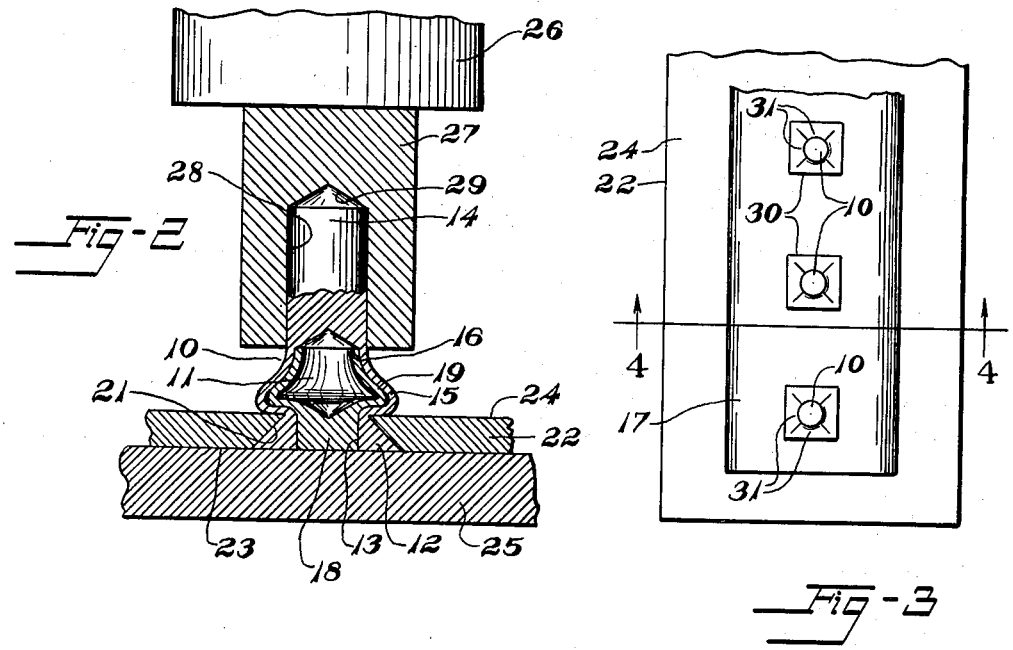
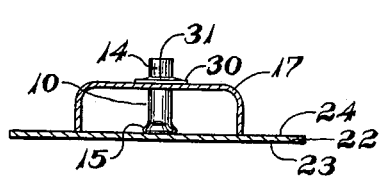
Inventors
Russell S. Colley
Homer E. Wilt
By Dwight L. Moody
Atty.

Patented Oct. 23, 1951

2,572,246

UNITED STATES PATENT OFFICE 2,572,246

EXPANSIBLE RIVET ASSEMBLY

Russell S. Colley, Cuyahoga Falls, and Homer E. Wilt, Akron, Ohio, assignors to The B. F. Goodrich Company, New York, N. Y., a corporation of New York Application January 3, 1949, Serial No. 68,808

10 Claims. (Cl. 85—40)

The invention relates to rivet attachments including expansible rivet assemblies.

Prior expansible tubular rivets of the interiorly threaded type, when upset in the work, have generally had the bores left open at the heads of the rivets as for the insertion of screws, resulting in lack of continuity of surface of the work where screws are not required. This lack of surface continuity is objectionable for some applications from the standpoint of appearance. The expedient of inserting plugs in the bores subsequent to the upsetting operation and retaining the plugs in the bores as by a press fit or by a threaded engagement with the rivets, has been found to be objectionably costly and not wholly effective for the intended purpose, especially since the plugs tend to loosen and/or fall out of the rivets as from vibration of the work.

Other expansible tubular rivets of the type upset by headed draw pins extending through the same, which pins have been broken off at the heads of the rivets and left in the latter as fillers of the bores, have required smoothing of the rough, broken ends of the pins, and also the pins have tended to loosen and fall out of the rivets under vibration of the work. This is objectionable especially from the standpoints of cost and safety.

Ordinary solid rivets headed at both ends in the upset condition, do not permit mounting members on the rivets at a face of the work in spaced-apart relationship thereto and for this reason are unsuited for some applications requiring utilization of such members.

An object of the invention is to overcome the foregoing and other disadvantages of the prior rivets and rivet attachments.

Other objects of the invention are to provide an improved rivet attachment having continuity of surface at a face of the work; to provide an improved expansible rivet assembly; to provide for pre-plugging an expansible hollow rivet; to provide for preventing loosening and/or falling out of a plug in the hollow rivet in the upset condition; to provide for reinforcing the wall of the rivet against shear stresses; to provide for coincidental upsetting of the rivet and the plug therein; and to provide for simplicity of construction, convenience of manufacture, assembly and upsetting, and for effectiveness of operation.

Further objects are to provide an improved method of making an expansible rivet assembly; and to provide an improved method of upsetting the rivet assembly in the work.

These and other objects and advantages of the invention will be apparent from the following description:

In the accompanying drawings which form a part of this specification and in which like numerals are employed to designate like parts throughout the same, Fig. 1 is an elevational view of an expansible rivet assembly positioned on an apertured work-element and an anvil preparatory to being upset, and constructed in accordance with and embodying the invention, parts being broken away and in section, Fig. 2 is an elevational view of the rivet assembly in upset condition on the work-element with upsetting apparatus backingly supporting the respective parts of the rivet attachment, parts being broken away and in section, Fig. 3 is a view from above showing a plurality of spaced-apart rivet assemblies in upset condition mounting a channel member at a face of the work-element, parts being broken away, Fig. 4 is a sectional view taken along line 4—4 of Fig. 3.

In the illustrative embodiment of the invention shown in the drawings, the construction includes an expansible rivet assembly comprising a body 10 or rivet element of ductile material such, for example, as aluminum, Duralumin, brass, steel, or other suitable metal material, and a reinforcing plug 11 of suitable ductile material comparable in ductility to that of the body 10 and desirably a material which will not result in an electrolytically corrosive action between the body and the plug. The body 10 may be of elongated cylindrical form of substantially uniform outside diameter, and has at one end thereof a seating portion 12 preferably formed to a head of the desired type such, for example, as countersunk, round, flat or other shape, the countersunk head being shown in the drawings. The body 10 may be made of a solid cylindrical rivet blank which has formed therein a bore 13, preferably of substantially uniform diameter, extending from the head 12 to a position spaced-apart from the head and the other end of the body, although not necessarily limited thereto, facilitating the provision of a solid end portion 14. The end portion 14 permits the attachment thereto of a member 17.

The arrangement provides a thin, continuous, annular wall of the body constituting an outwardly expansible portion 15 extending axially from the head 12 to the inner end of the bore 13, that is, between the head 12 and the solid end portion 14, the portions 14 and 15 constituting the shank of the headed body 10. The arrangement also makes possible the provision of a surface at the inner end of the bore facing toward the head and constituting an annular shoulder or abutment 16 extending laterally or radially inward of the bore for facilitating expansion of the plug 11.

The reinforcing plug 11 may be made of a solid cylindrical blank of suitable material and substantially uniform outside diameter of a dimension such that the wall of the plug along its axial extent will be in snug-fitting, axially slidable relation to the adjacent wall of the bore 13 for the assembled condition of the body 10 and the plug 11. The cylindrical reinforcing plug has preferably a solid portion 18 at one end thereof for disposition at the head 12 and for entirely closing the bore 13 in conformance with the configuration of the head. The plug 11 also has formed therein an axially-extending bore of substantially uniform diameter in a portion 19 positionable axially along the major part of the length of the expansible portion 15. Desirably, the bore extends from the other end of the plug to the solid portion 18 to provide the hollow end portion 19 which is adapted to be expanded and is in overlapping, slidable relation to the outwardly expansible portion 15 for the assembled condition shown especially in Fig. 1. The overall length of the plug may be less than the length from the head 12 to the abutment 16, so that when the plug is inserted hollow end first into the bore 13 until the solid portion 18 is flush with the head 12, the inner or free end at 19a of the portion 19 constitutes a second shoulder and terminates short of and is spaced-apart from the abutment 16, as shown especially in Fig. 1.

After the rivet body 10 and the reinforcing plug 11 have been formed, as described hereinabove, and have been assembled in the relationship shown especially in Fig. 1, the expansible rivet assembly comprising the two elements 10 and 11, respectively, is positioned in the aperture 21 of a work-element 22, whereby the head 12 seats against the margin of the aperture 21 at a face 23 of the work-element and the body 10 projects beyond the other face 24 of the work-element, which latter may be of thin sheet metal material such as aluminum or steel.

The expansible rivet assembly and the work-element may be maintained in the desired relationship and backingly supported by a suitable platform surface or anvil 25 of stiff material preparatory to upsetting the rivet assembly. A tool 26 having a hollow rivet-receiving portion 27 of suitable metal material such, for example, as hardened steel, may then be disposed in axial alignment with the body 10. Upon movement of the tool 26 toward the head 12 and into engagement with the solid end portion 14, the latter enters the opening 28 of the portion 27 and slides therethrough until it contacts an inner end face 29 of the tool 26. Further movement of the tool 26 applies axial force at the respective ends of the expansible rivet assembly resulting in an initial expansion or outward bulging of the thin wall of the outwardly expansible portion 15 and coincidentally therewith, the wall of the hollow end portion 19 slides in the bore 13 until the free end 19a of the portion 19 contacts the abutment 16. This initial bulging of the wall of the portion 15 facilitates assuring outward bulging of the portion 19 since the portion 15 then offers minimum restraint to the wall of the portion 19.

During the axial movement of the tool the hollow portion 27 backingly supports the end portion 14 and facilitates maintaining the axial alignment of the body 10 and the reinforcing plug 11.

Under subsequent application of slightly greater axial force in a manner to effect compression of the rivet assembly, the hollow end portion 19 remains seated firmly against the abutment 16 and the walls of the expansible portion 15 and the hollow end portion 19 are simultaneously outwardly bulged to substantially the configuration shown especially in Fig. 2, and the bulged wall of the portion 15 contacts the face 24 of the work-element 22. The tool 26 is then withdrawn from engagement with the rivet assembly. Thus the bulged walls of the portions 15 and 19 are in substantially conforming, interlocking, and contacting relation one to another thereby fixedly securing together the body 10 and the plug 11 and effectively locking the plug in position against loosening and/or falling out of the assembly under vibration of the work-element. The space within the hollow end portion 19 contains fluid which, for example, may be liquid or air, and the space may be sealed effectively upon circumferential seating of the free end 19a against the annular abutment 16; hence the progressive upsetting of the rivet assembly may result in some compression of the fluid which promotes the desired conforming bulging and interlocking of the walls of the portions 15 and 19.

After the upsetting operations, the expansible rivet assembly extends through the aperture 21 in attached relation to the work element 22 and the member 17 may then be engaged with the end portion 14. For the upset condition of the rivet assembly, the head 12 and the solid portion 18 are flush with the face 23 of the work-element 22, whereby the face 23 has continuity of surface entirely across the aperture 21 which is desirable for many applications, and whereby the aperture is sealed as against the passage of water and other foreign material.

The member 17, which may be a U-shaped channel of suitable metal, is secured to the work-element 22 at the face 24 as by a plurality of aligned and spaced-apart rivet assemblies which are mounted on the work-element in the manner described hereinabove and as shown especially in Figs. 3 and 4. The channel member 17 may be positioned with the legs extending toward the face 24 and may be engaged with the end portions 14, 14 of the rivet assemblies as by suitable fasteners such, for example, as plate type fastener elements 30, 30 having resilient pronged portions 31, 31.

The rivet attachment comprising the work-element 22, the expansible rivet assembly and the member 17 may be utilized in the construction of condensers and/or evaporators for household refrigerators wherein continuity of surface of the work-element is desirable, especially from the standpoint of appearance. The construction and arrangement makes possible this continuity of surface while advantageously providing a pre-plugged expansible rivet assembly having substantial resistance to shear laterally of the assembly at the outwardly bulged region thereof. The construction and arrangement effectively retains the plug 11 fixedly secured to the expansible rivet body 10 in a manner which resists loosening and/or falling out of the plug from the upset assembly under vibration thereof. The rivet assembly is relatively inexpensive to make and may be conveniently attached to the desired work, and has been found to be particularly useful for certain applications.

Variations may be made without departing from the scope of the invention as it is defined in the following claims.

We claim:

1. An expansible rivet assembly comprising a body having a bore extending into the same from an end thereof and having a force-receiving and transmitting portion spaced from said end comprising stiff material of sufficient thickness and stiffness to resist substantial distortion of said portion while receiving and transmitting compressive force applied to said body in the direction axially thereof for upsetting said rivet assembly, and a hollow reinforcing plug in said bore of said body extending from said end thereof toward the other end of said body for disposition in force-transmitting relation to said portion axially of said body and having a closed end closing the assembly at the first said end of the body, said body and said plug having continuously annular wall portions in telescopic overlapping relation one to the other intermediate the first said end and said force-receiving and transmitting portion of said body, said wall portions being outwardly expansible together at a face of the work by compressive force applied to both said body including said force-receiving and transmitting portion thereof and said plug in the axial direction of said body and said plug.

2. An expansible rivet assembly comprising a body having a bore extending into the same from an end thereof and having a force-receiving portion spaced from said end comprising stiff material of sufficient thickness and stiffness to resist substantial distortion of said portion while receiving compressive force applied axially of said body for upsetting said rivet assembly, and a hollow reinforcing plug in said bore of said body extending from said end thereof approximately to said force-receiving portion of said body and having a closed end closing the assembly at said end of the body, said body and said plug having continuously annular wall portions in telescopic overlapping relation one to the other intermediate said end and said force-receiving portion of said body, said assembly having means in said bore at and braced axially by said force-receiving portion for transmitting compressive force in the direction axially of said body from one of said wall portions to the other wall portion, and said wall portions being outwardly expansible together at a face of the work by compressive force applied in the axial direction to one of said wall portions and transmitted in the axial direction to the other wall portion by said means.

3. An expansible rivet assembly comprising a body having a bore extending into the same from an end thereof, a force-receiving portion spaced from said end of said body, said portion comprising stiff material of sufficient thickness and stiffness to resist substantial distortion of said portion while receiving compressive force applied to said body in the direction axially thereof for upsetting said rivet assembly, and force-transmitting means in said bore intermediate said end and said portion of said body and braced by said portion in the direction axially of said body, and a hollow reinforcing plug in said bore of said body extending from said end thereof approximately to said portion of said body and disposed for engagement in force-transmitting relation with said means of said body in the axial direction of the rivet assembly and having a closed end closing the assembly at said end of the body, said body and said plug having continuously annular wall portions in telescopic overlapping relation one to the other between said end and said means of said body, said wall portions being outwardly expansible together at a face of the work by compressive force applied in the axial direction to said body including said force-receiving portion thereof and transmitted axially to said plug through said means of said body under the engagement of said means with said plug.

4. An expansible rivet assembly comprising a tubular body having a bore extending therein from an end thereof, a force-receiving portion at the other end of said body, said portion comprising stiff material of sufficient thickness and stiffness to resist substantial distortion of said portion while receiving compressive force applied to said body in the direction axially thereof for upsetting said rivet assembly, and an abutment in said bore at and braced axially by said portion of said body, and a tubular reinforcing plug in said bore of said body extending from the first said end thereof approximately to said abutment in alignment therewith in the axial direction and having a closed end closing the assembly at said first said end of said body, said tubular body and said tubular plug having continuously annular wall portions in telescopic overlapping relation one to the other between said first said end of said body and said abutment thereof and outwardly expansible together at a face of the work by compressive force applied in the axial direction to said body including said force-receiving portion thereof and transmitted in the axial direction to said plug through said abutment of said body.

5. An expansible rivet assembly comprising a hollow body closed at one end thereof to provide a force-receiving and transmitting portion at said end, said portion comprising stiff material of sufficient thickness and stiffness to resist substantial distortion of said portion while receiving and transmitting compressive force applied to said body in the direction axially thereof for upsetting said rivet assembly, and a hollow reinforcing plug disposed telescopically in said body for disposition in force-transmitting relation to said portion axially thereof and having a closed end closing the assembly at the other end of said body, adjacent walls of said body and said plug intermediate said force-receiving and transmitting portion and said other end of said body being continuously annular and disposed in telescopic overlapping relation, said adjacent walls of said body and said plug being outwardly expansible together at a face of the work by compressive force applied in the axial direction to both said body including said force-receiving and transmitting portion thereof and said plug.

6. An expansible rivet assembly comprising a hollow body closed at one end thereof to provide a force-receiving portion at said end, said force-receiving portion comprising stiff material of sufficient thickness and stiffness to resist substantial distortion of said portion while receiving compressive force applied to said body in the direction axially thereof for upsetting said rivet assembly, a hollow reinforcing plug disposed telescopically in said body and having a closed end closing the assembly at the other end of said body, and force-transmitting means in the bore of said hollow body at and braced axially by said force-receiving portion thereof for engagement with said plug, wall portions of said body and said plug intermediate said other end of said body and said means being continuously annular and in telescopic overlapping relation one to the other and outwardly expansible together at a face of the work by compressive force applied in the axial direction to said body including said force-receiving portion thereof and transmitted in said axial direction to said plug through said means of said body.

7. An expansible rivet assembly comprising a hollow body closed at one end thereof to provide an abutment in the bore thereof and a force-receiving portion beyond and bracing said abutment in the direction axially of said body, said portion comprising stiff material of sufficient thickness and stiffness to resist substantial distortion of said portion while receiving compressive force applied axially to said body for upsetting said rivet assembly, and a hollow reinforcing plug disposed telescopically in said body in alignment with said abutment in the direction axially of said body for engaging said abutment and having a closed end closing the assembly at the other end of said body, wall portions of said body and said plug between said other end and said abutment of said body being continuously annular and in telescopic overlapping relation one to the other and outwardly expansible together at a face of the work by compressive force applied in the axial direction to said body including said force-receiving portion thereof and transmitted in the axial direction to said plug through said abutment of said body.

8. An expansible rivet assembly for attachment to an apertured work-element, said rivet assembly comprising a body of ductile material having a bore therein extending from an end thereof, an abutment in said bore spaced from said end, an outwardly expansible portion having a continuously annular wall intermediate said end and said abutment, and an end portion beyond said abutment in bracing relation therewith axially of said body comprising said material of sufficient thickness and stiffness to resist substantial distortion of said end portion while receiving compressive force applied axially to said body for upsetting said rivet assembly, and said rivet assembly comprising a reinforcing plug of ductile material in said bore at said end of said body presenting a seating surface remote from said end for disposition against said abutment in force-transmitting relation therewith axially of said body during the upsetting of said rivet assembly, said reinforcing plug having a closed end closing the assembly at said end of the body and a hollow portion having a continuously annular wall overlapping said expansible portion of said body and outwardly expansible together with said wall of said expansible portion at a face of the work-element by compressive force applied axially to said plug at said seating surface thereof through said abutment of said body.

9. An expansible rivet assembly for attachment to an apertured work-element, said assembly comprising a body of ductile material having a seating portion at one end thereof and a bore therein extending from said seating portion to provide adjacent said portion a thin continuously annular wall of said material constituting an outwardly expansible portion of said body, said body having in said bore an abutment extending laterally of said body adjacent the end of said expansible portion remote with respect to said seating portion, and an end portion extending away from said abutment in bracing relation therewith axially of said body comprising said material of sufficient thickness and stiffness to resist substantial distortion of said end portion while receiving compressive force applied axially to said body for upsetting said rivet assembly, and said rivet assembly comprising a reinforcing plug of ductile material extending in said bore from said seating portion and having a closed end closing the assembly at said end of the body and comprising a hollow end portion having a continuously annular wall in overlapping slideable relation to said expansible portion and presenting at the free end of said hollow end portion a seating surface for disposition against said abutment in force-transmitting relation therewith axially of said body during the upsetting of said rivet assembly, said hollow end portion of said plug before the upsetting of said rivet assembly having said seating surface at said free end disposed adjacent and spaced from said abutment of said body and after the upsetting of said rivet assembly having said seating surface at said free end seated against said abutment, said hollow end portion of said plug being outwardly expansible together with said expansible portion of said body at a face of the work-element by a compressive force applied axially to said body including said end portion thereof and transmitted axially to said plug at said seating surface thereof through said abutment of said body.

10. An expansible rivet assembly for attachment to an apertured work-element, said rivet assembly comprising a cylindrical body of ductile material having a head at one end thereof and a bore therein extending from said head to provide adjacent said head a thin continuously annular wall of said material constituting an outwardly expansible portion of said body, said body having in said bore a continuously annular abutment extending radially inward of said body at the end of said expansible portion remote with respect to said head and said body having a closed end portion extending away from said abutment in bracing relation therewith axially of said body comprising said material of sufficient thickness and stiffness to resist substantial distortion of said end portion while receiving compressive force applied axially to said body for upsetting said rivet assembly, and said rivet assembly comprising a cylindrical reinforcing plug of ductile material in said bore having a solid portion closing said bore at said head and a hollow end portion having a continuously annular wall extending away from said solid portion in overlapping slideable relation to said expansible portion and presenting at the free end of said hollow end portion a seating surface for disposition against said abutment in force-transmitting relation therewith axially of said body during the upsetting of said rivet assembly, said hollow end portion of the plug before the upsetting of said rivet assembly having said seating surface at said free end adjacent and spaced from said abutment and after the upsetting of said rivet assembly having said seating surface at said free end seated against said abutment, said hollow end portion of said plug being outwardly expansible together with said expansible portion of said body at a face of the work-element by compressive force applied axially to said body including said end portion thereof and transmitted axially to said plug at said seating surface thereof through said abutment of said body.

RUSSELL S. COLLEY.
HOMER E. WILT.

REFERENCES CITED

The following references are of record in the file of this patent:

UNITED STATES PATENTS

| Number | Name | Date |
|---|---|---|
| 295,593 | Thayer | Mar. 25, 1884 |
| 1,609,597 | Arnt | Dec. 7, 1926 |
| 1,824,028 | Miller | Sept. 22, 1931 |
| 1,994,210 | Chobert | Mar. 12, 1935 |
| 2,122,557 | Canter | July 5, 1938 |
| 2,370,776 | Carlson | Mar. 6, 1945 |
| 2,397,111 | Huck | Mar. 26, 1946 |
| 2,415,560 | Higley | Feb. 11, 1947 |
| 2,432,949 | Thorngren | Dec. 16, 1947 |
| 2,451,356 | Rechton | Oct. 12, 1948 |
| 2,502,267 | McPherson | Mar. 28, 1950 |
| 2,511,920 | Keller | June 20, 1950 |

FOREIGN PATENTS

| Number | Country | Date |
|---|---|---|
| 878,521 | France | Jan. 22, 1943 |